US011004439B2

(12) United States Patent
Lee et al.

(10) Patent No.: US 11,004,439 B2
(45) Date of Patent: May 11, 2021

(54) ACOUSTIC ABSORBER

(71) Applicant: Toyota Motor Engineering & Manufacturing North America, Inc., Plano, TX (US)

(72) Inventors: Taehwa Lee, Ann Arbor, MI (US); Hideo Iizuka, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 557 days.

(21) Appl. No.: 15/904,770

(22) Filed: Feb. 26, 2018

(65) Prior Publication Data

US 2019/0266992 A1    Aug. 29, 2019

(51) Int. Cl.
| | |
|---|---|
| *G10K 11/172* | (2006.01) |
| *G10K 11/168* | (2006.01) |
| *G10K 11/20* | (2006.01) |
| *G10K 11/16* | (2006.01) |

(52) U.S. Cl.
CPC ............ *G10K 11/205* (2013.01); *G10K 11/16* (2013.01)

(58) Field of Classification Search
CPC .... G10K 11/16; G10K 11/168; G10K 11/205; G10K 11/20; G10K 11/18; G10K 11/172; E04B 2001/8438; E04B 2001/8485; E04B 2001/849
See application file for complete search history.

(56) References Cited

U.S. PATENT DOCUMENTS

| | | | | |
|---|---|---|---|---|
| 2,116,771 A * | 5/1938 | Seaman | ..................... | E04B 1/86 428/153 |
| 3,087,565 A * | 4/1963 | Kerwin, Jr. | ................ | E04B 1/82 181/208 |
| 3,444,956 A * | 5/1969 | Gaffney | ..................... | E04B 1/86 181/290 |
| 3,593,819 A * | 7/1971 | Giraudeau | ............ | E04B 1/8409 181/288 |
| 3,713,508 A * | 1/1973 | Eckel | ........................ | B32B 3/28 181/287 |
| 3,949,827 A * | 4/1976 | Witherspoon | ........ | E04B 2/7437 181/284 |
| 3,991,848 A * | 11/1976 | Davis | ........................ | E04B 1/90 181/286 |

(Continued)

OTHER PUBLICATIONS

Leroy, V. et al., "Superabsorption of acoustic waves with bubble metascreens", Phys. Rev. B, 91, article 020301(R) (2015).

*Primary Examiner* — Edgardo San Martin
(74) *Attorney, Agent, or Firm* — Christopher G. Darrow; Darrow Mustafa PC

(57) ABSTRACT

Acoustic measurement systems include an enclosure having a high efficiency yet very thin acoustic absorber coating portions thereof, in order to diminish background reflections. The thin acoustic absorber includes a reflective sublayer having a periodic array of indentations on its surface. The periodic array of indentations can be one-dimensional or two dimensional. The thin acoustic absorber further includes a thin absorbing layer overlaid on the reflective sublayer, and typically formed of a viscoelastic foam. The thin acoustic absorber possesses unprecedented absorption efficiency across a broad frequency range and at normal or oblique angles of incidence.

20 Claims, 4 Drawing Sheets

(56) References Cited

U.S. PATENT DOCUMENTS

| | | | | |
|---|---|---|---|---|
| 4,244,439 A * | 1/1981 | Wested | ............... | E01F 8/0094 181/210 |
| 4,253,543 A * | 3/1981 | Johansson | ............... | G10K 11/16 181/286 |
| 4,278,146 A * | 7/1981 | Lerner | ............... | E04B 1/86 181/210 |
| 4,838,524 A * | 6/1989 | McKeown | ............... | E01F 8/0011 181/210 |
| 4,909,003 A * | 3/1990 | Hennigan | ............... | E04C 2/284 52/144 |
| 5,361,163 A * | 11/1994 | Matsuda | ............... | G03B 21/60 264/1.9 |
| 6,024,190 A * | 2/2000 | Ritzema | ............... | B60R 13/083 181/286 |
| 6,112,849 A * | 9/2000 | Garbers | ............... | E01F 8/0082 105/452 |
| 6,890,018 B1 * | 5/2005 | Koa | ............... | B60J 5/0416 296/146.5 |
| 7,263,028 B2 | 8/2007 | Thomas et al. | | |
| 7,631,727 B2 * | 12/2009 | Thomas | ............... | B32B 3/10 181/288 |
| 7,721,847 B2 * | 5/2010 | Coury | ............... | E04B 9/001 181/293 |
| 8,223,977 B2 * | 7/2012 | Watanabe | ............... | H04R 1/406 381/26 |
| 8,474,572 B2 * | 7/2013 | de Lima | ............... | G01R 33/3854 181/207 |
| 8,474,574 B1 * | 7/2013 | Kobayashi | ............... | G10K 11/172 181/292 |
| 9,343,059 B2 | 5/2016 | Wilson et al. | | |
| 9,508,334 B1 * | 11/2016 | D'Antonio | ............... | E04B 1/84 |
| 9,703,045 B2 | 7/2017 | Evans et al. | | |
| 9,711,129 B2 | 7/2017 | Sheng et al. | | |
| 9,845,598 B1 * | 12/2017 | Hsu | ............... | E04F 13/0851 |
| 2003/0006092 A1 * | 1/2003 | D'Antonio | ............... | E04B 1/86 181/293 |
| 2004/0129493 A1 * | 7/2004 | Campbell | ............... | B60R 13/08 181/204 |
| 2005/0263346 A1 * | 12/2005 | Nishimura | ............... | G10K 11/172 181/290 |
| 2006/0260870 A1 * | 11/2006 | Nakagawa | ............... | E04B 9/34 181/295 |
| 2006/0272279 A1 * | 12/2006 | Palumbo | ............... | B60R 13/08 52/783.1 |
| 2015/0116721 A1 | 4/2015 | Kats et al. | | |
| 2015/0279345 A1 | 10/2015 | Mathur | | |

* cited by examiner

ACOUSTIC ABSORBER

TECHNICAL FIELD

The present disclosure generally relates to sound absorbing structures and, more particularly, to thin structures having high acoustic absorption capability across a broad frequency range.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Acoustic reflection measurement systems, such as sonar, are widely used for detection and imaging of objects. In such systems, a sound transmitter directs acoustic waves toward an object and a detector measures waves reflected by the object. Controlled acoustic reflection measurement experiments are used for detailed object imaging, such as in quality control, as well as for calibration of sound transmitters and detectors.

A controlled acoustic measurement experiment is typically conducted by directing acoustic waves at a test object located in an enclosure containing an acoustic transmission fluid. The walls of the enclosure are able to reflect the transmitted sound waves, and such reflections from enclosure walls can interfere with detection of the reflections from the test object. This deleterious effect can be mitigated by covering enclosure walls with a sound absorbing material, thereby minimizing such competing reflections.

Conventional sound absorption materials must be undesirably thick in order to possess effective absorption efficiency. Such thick materials occupy an undesirably high volume in a limited space, and increase cost. On the other hand, thin acoustic absorbing materials based on acoustic resonance have a very narrow effective frequency range. Such structures also can be sensitive to the incident angle of sound, leading to poor absorption for oblique angles.

Acoustic metamaterials having multiple components and resonant structures to combine the properties of viscous absorbers and resonators are known. Such materials can have high absorption efficiency despite being extremely thin. Known instances of such materials tend to have narrow frequency ranges of absorption frequency, however. For example, a material having a dissipative soft solid medium containing a layer of gas cylinders and backed by a flat steel showed strong absorption efficiency (>90% absorption), but only across a frequency range of 1-3 MHz.

For these reasons, and for multiple general applications, it would be desirable to develop a thin acoustic absorber having high absorption efficiency across a broadband frequency range.

SUMMARY

This section provides a general summary of the disclosure, and is not a comprehensive disclosure of its full scope or all of its features.

In various aspects, the present teachings provide an acoustic absorber. The acoustic absorber has an acoustically reflective sublayer that has a substantially planar surface. The acoustically reflective sublayer also includes a periodic array of indentations in the substantially planar surface. The periodic array of indentations has a period substantially smaller than the wavelength of a target acoustic wave. The acoustic absorber also has an absorbing layer overlaid on the substantially planar surface of the acoustically reflective sublayer. In some variations, the absorbing layer has a thickness less than about 1 mm.

In other aspects, the present teachings provide a system for acoustic measurement. The system includes an enclosure defined by one or more walls and a fluid medium contained in the enclosure for the propagation of acoustic waves. The system further includes an acoustic source present at one end of the enclosure, to transmit acoustic waves through the fluid medium, and an acoustic absorber positioned at a portion of a surface of the one or more walls. The acoustic absorber has an acoustically reflective sublayer that has a substantially planar surface. The acoustically reflective sublayer also includes a periodic array of indentations in the substantially planar surface. The periodic array of indentations has a period substantially smaller than the wavelength of a target acoustic wave. The acoustic absorber also has an absorbing layer overlaid on the substantially planar surface of the acoustically reflective sublayer. In some variations, the absorbing layer has a thickness less than about 1 mm.

Further areas of applicability and various methods of enhancing the disclosed technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide sound absorbing structures having very high acoustic absorbance despite being very thin. The sound absorbing structures of the present teachings additionally, and in contrast to competing structures, provide high absorbance across a broad frequency range.

The disclosed sound absorbing structures include an absorbing material, such as a foam, overlaid on a reflective material, such as a metal. The surface of the reflective material is structured with periodic indentations, the indentations holding gas bubbles entrained between the absorbing layer and the reflective layer. The indentations, and thus the gas bubbles trapped therein, have a period much lower than the wavelength of the acoustic waves to be reflected.

As herein, and unless otherwise specifically indicated, the expressions "acoustic wave" and "sound wave" are interchangeable, and refer to an acoustic wave propagating through a carrier medium, such as a fluid. Unless otherwise specifically indicated, neither term implies a frequency within a range normally audible to humans, but can include such a frequency. These expressions can also include ultrasonic frequencies, such as frequencies above 20 KHz, as well as frequencies in the MHz range.

Figure 1:
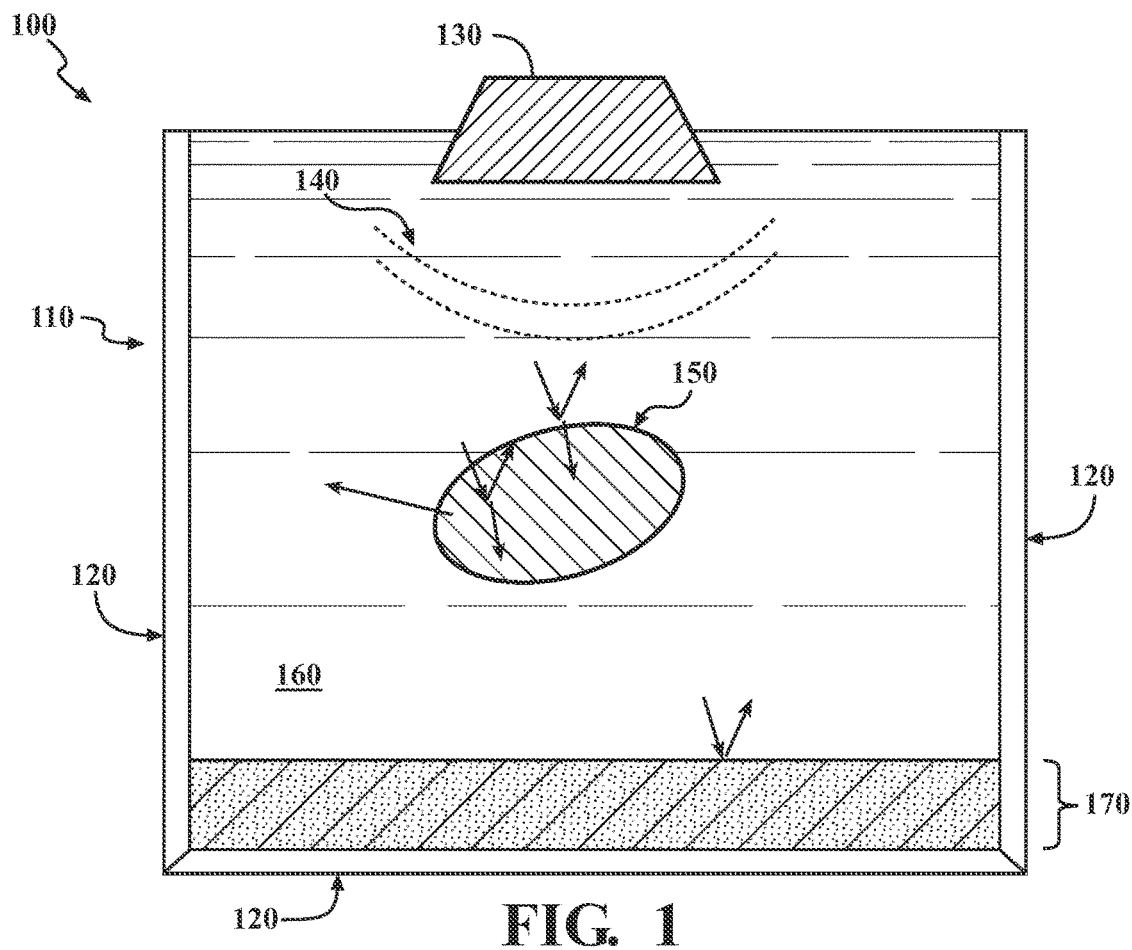
FIG. 1 is a schematic view of an exemplary sound absorption experiment.

FIG. 1 shows a schematic view of a system 100 for acoustic measurement. The system 100 of FIG. 1 includes an enclosure 110 defined by one or more walls 120. It will be understood that the enclosure 110 need not necessarily entirely enclose the space within. An acoustic source 130 is present at one end of the enclosure 110, to transmit acoustic waves 140 through a fluid medium 160 contained inside the enclosure 110, toward a test object 150. An acoustic absorber 170 is located on the inside of at least a portion of a wall 120, typically at a portion located at the opposite end from the acoustic source 130. As transmitted acoustic waves 140 are reflected by the test object 150, imperfections in the test object 150, such as cracks or other inhomogeneities are indicated by the reflection pattern that is detected by a detector (not shown), typically located near the source. The acoustic absorber 170, by absorbing a preponderance of the waves 140 not reflected by the test object 150, serves to minimize background reflections that could operate as noise.

Figure 2:
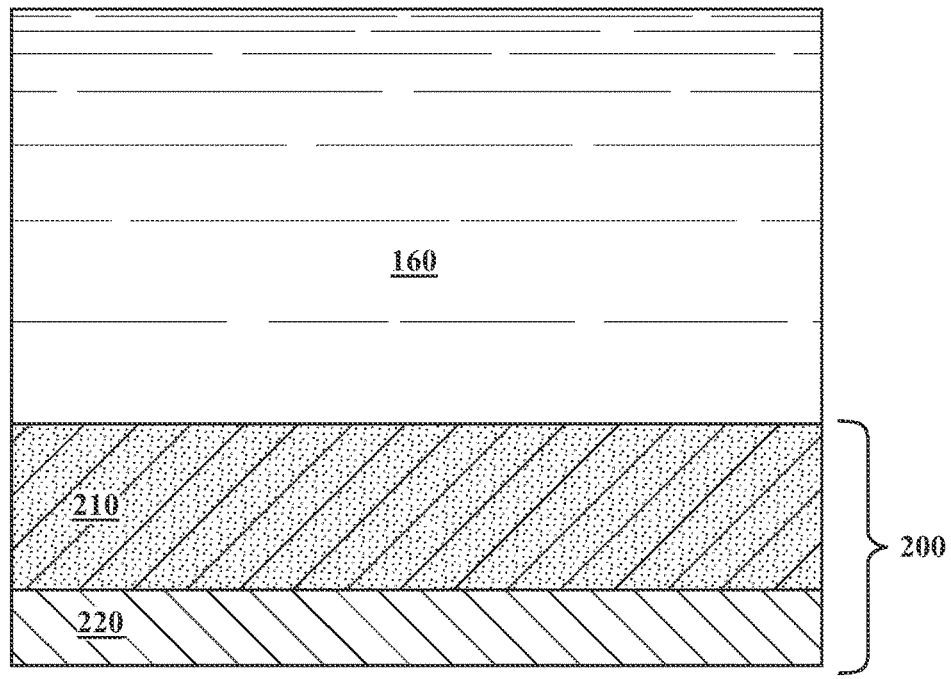
FIG. 2 is a schematic view of a prior art sound absorption structure.

FIG. 2 shows a schematic view of a conventional sound absorption panel 200, also contacting a fluid medium 160. The conventional acoustic absorber 200 of FIG. 2 includes an absorptive layer 210 overlaying a reflective surface 220. The absorptive layer 210 of FIG. 2 is typically a foam or porous viscoelastic material, but could be any material configured to dissipate sound energy by converting it into heat through viscosity. When implemented into a system 100 of the type shown in FIG. 1, the absorptive layer 210, the reflective surface 220 would typically be the innermost surface of the wall 120, so that the absorptive layer 210 is directly layered onto the wall 120. It will be appreciated that, because of the relative inefficiency of the conventional absorption panel 200, the absorptive layer 220 must be undesirably thick in order to achieve a suitable degree of acoustic absorption.

Figure 3A:
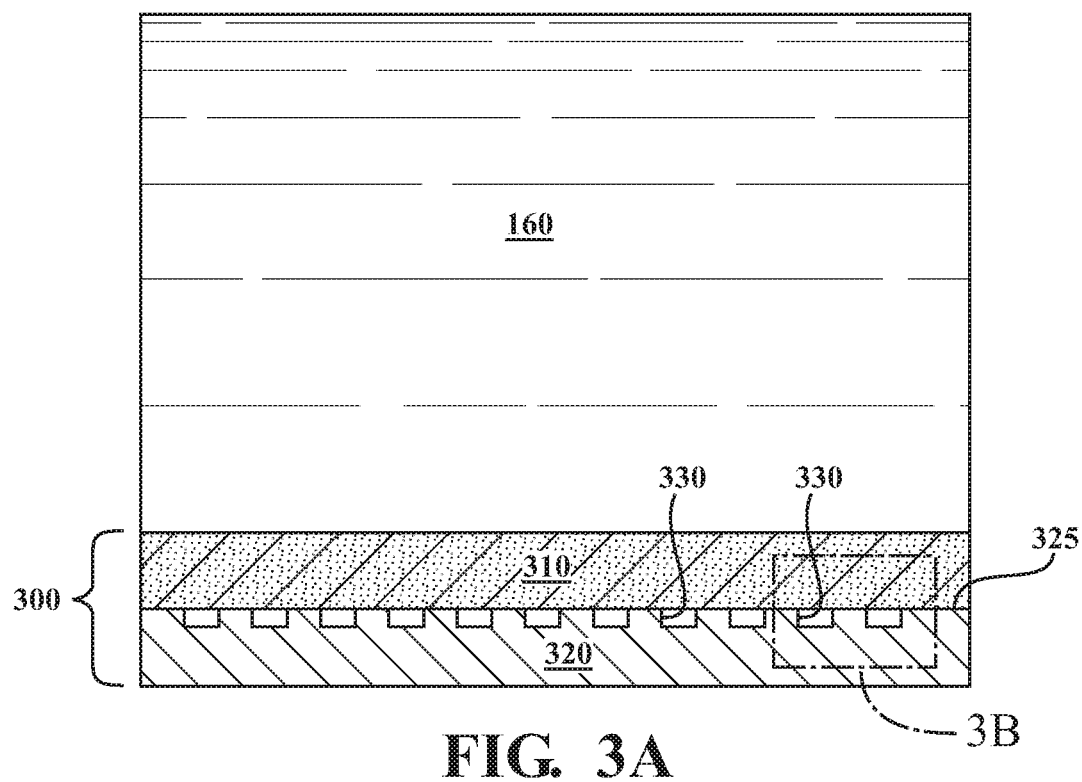
FIG. 3A is a schematic view of a thin acoustic absorber of the present teachings.
Figure 3B:
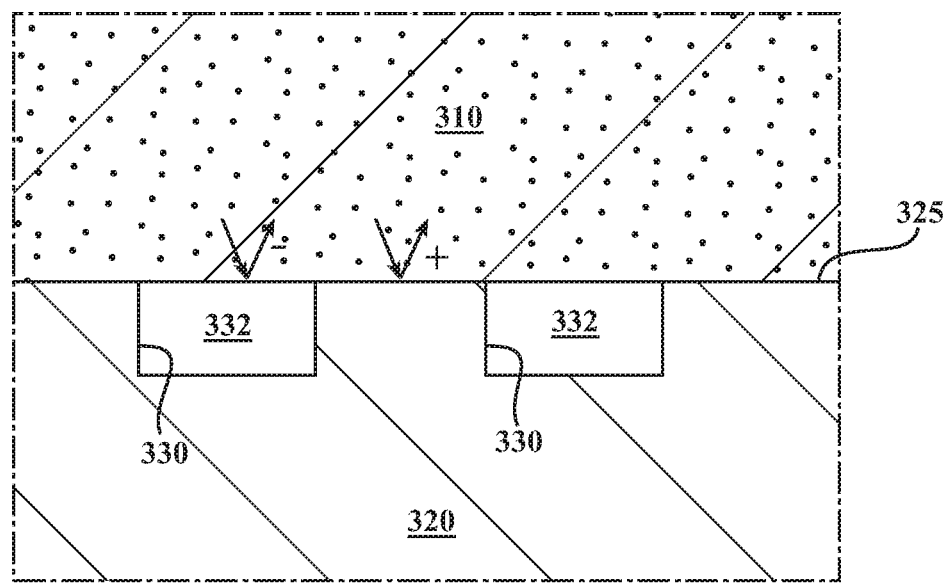
FIG. 3B is a magnified view of a portion of the absorber of FIG. 3A.

FIG. 3A shows a schematic view of a thin acoustic absorber 300 structure of the present teachings, while FIG. 3B shows a magnified view of a portion of the structure 300 of FIG. 3A. The thin acoustic absorber 300 includes a reflective sublayer 320. The reflective sublayer 320 can be composed of any substantially acoustically reflective material and, in many implementations, will be composed of a metal. The surface 325 of the reflective sublayer 320 includes an array of periodic indentations 332, formed by indentation perimeters 330. While the exemplary indentation perimeters 330 of FIGS. 3A and 3B are shown as having a cross-sectional shape that is open rectangular, their cross-sectional shape could equally be open triangular, semicircular, semi-ovoid, or any other regular shape.

The thin acoustic absorber 300 further includes an absorbing layer 310 overlaying the reflective sublayer 320, and contacting the surface 325 of the reflective sublayer 320. The absorbing layer 310 will generally be composed of a porous viscoelastic material, such as a polymeric foam, capable of dissipatively converting acoustic energy into heat. Exemplary materials suitable for use in the absorbing layer 310 include, without limitation, polydimethylsiloxane (PDMS), silicone rubber, and polyurethane. Overlaying the absorbing layer 310 on the reflective sublayer 320 thus converts each indentation 332 into an enclosed space in which gas is trapped. In many implementations, the absorbing layer 310 will have a thickness less than the wavelength, or less than one quarter of the wavelength, corresponding to the resonance frequency of the thin acoustic absorber 300. In some implementations, the absorbing layer 310 will have a thickness less than about 1 mm, or less than about 500 μm, or less than or equal to about 200 μm.

Figure 4A:
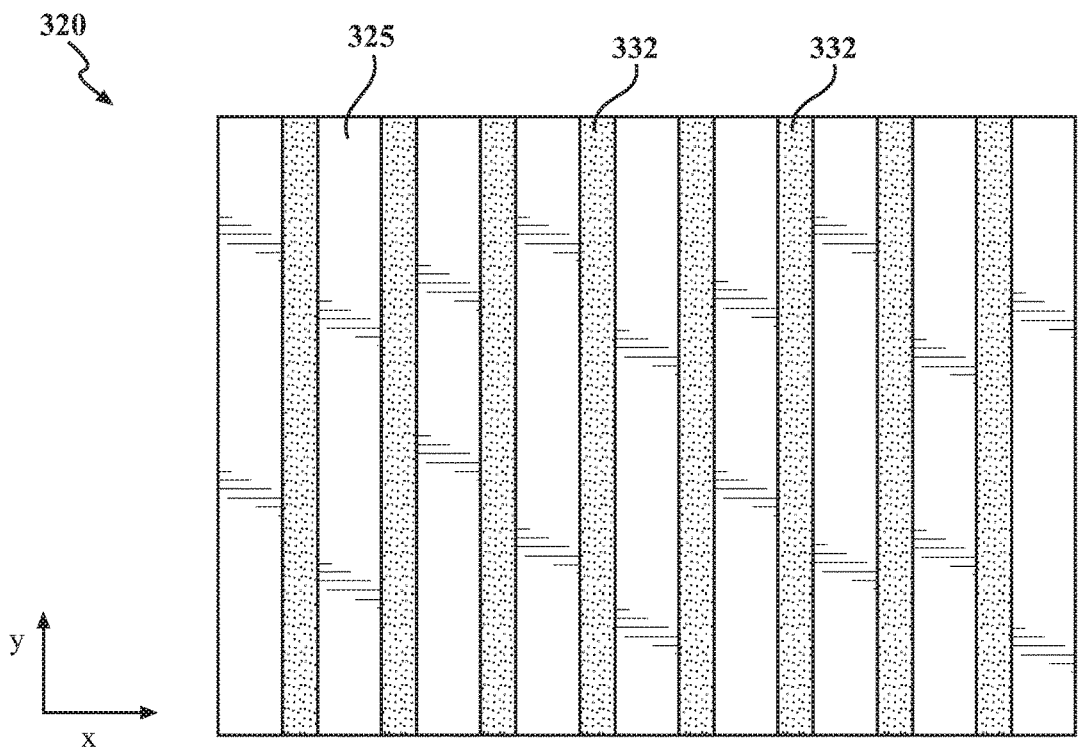
FIG. 4A is a top plan view of a reflective sublayer of a thin acoustic absorber of the type shown in FIG. 3A, the reflective sublayer having a one-dimensional array of indentations.
Figure 4B:
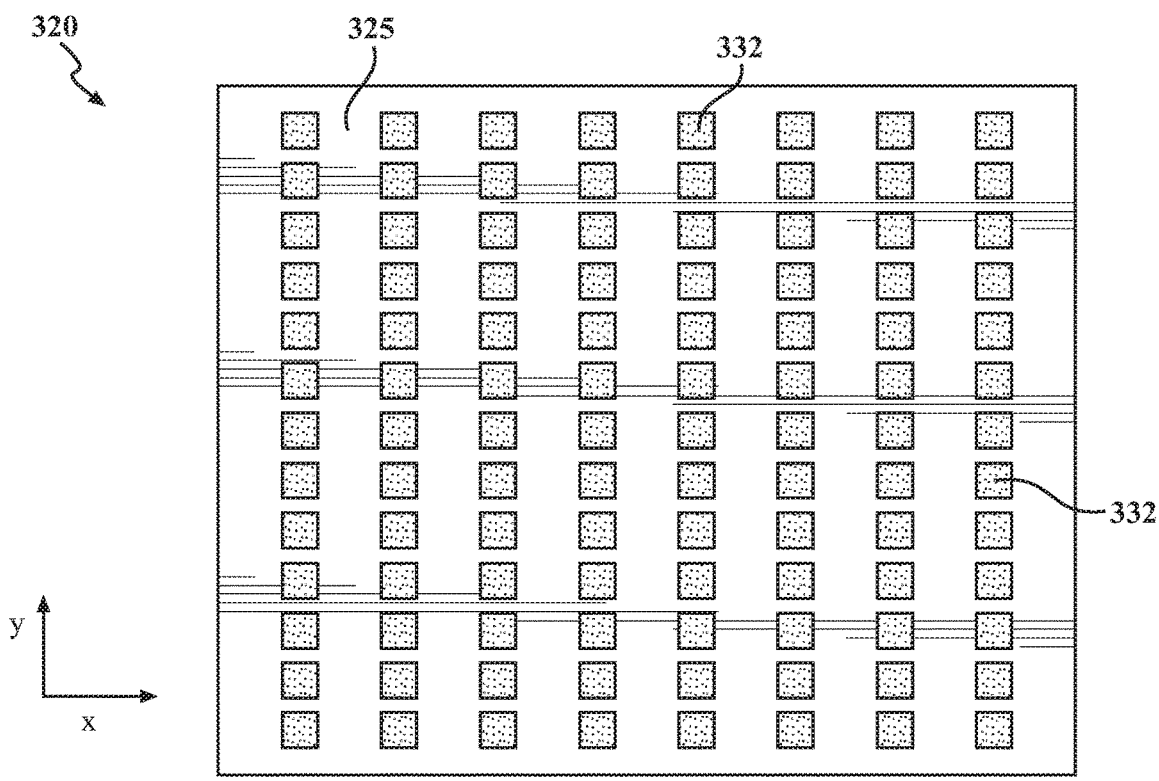
FIG. 4B is a top plan view of a reflective sublayer of a thin acoustic absorber of the type shown in FIG. 3A, the reflective sublayer having a two-dimensional array of indentations.

In different implementations, the array of periodic indentations 332 can be a one-dimensional array of periodic indentations 332, or a two-dimensional array of periodic indentations. FIGS. 4A and 4B show top plan views of two variations of the reflective sublayer 320, with the absorbing layer 310 removed. In the example of FIG. 4A, each indentation 332 is a groove running substantially the entire length of the surface 325 of the reflective sublayer 320 in the y dimension, and therefore having periodicity only in the x dimension. This can be termed a one-dimensional array. In the example of FIG. 4B, each indentation 332 is a point indentations, creating an array having periodicity in both x and y dimensions. This can be termed a two-dimensional array. While the indentations of FIG. 4B are shown as having a substantially square surface profile, they can alternately have a surface profile that is non-square rectangular, circular, triangular, ovoid, or any other regular shape. In some implementations in which the reflective sublayer 320 possesses a two-dimensional array of indentations 332, the two-dimensional array can have 90° rotational symmetry about an axis perpendicular to the surface 325 of the reflective sublayer 320.

The period of the array of periodic array of indentations 332 will generally be substantially smaller than the wavelength of the acoustic waves that the thin acoustic absorber 300 is designed to absorb. In different implementations, the period of the periodic array of indentations 332 will be less than 0.1 or less than 0.01 of the wavelength of the acoustic waves that the thin acoustic absorber 300 is designed to absorb. For example, in some implementations, the thin acoustic absorber 300 can be designed to absorb acoustic waves of a human-audible frequency, having a wavelength within a range of a few millimeters (mm) to a few tens of meters. In such implementations, the periodic array of indentations can have a period within a range of from about ten or several tens of μm to about one mm. In some implementations, the thin acoustic absorber 300 will be designed to absorb acoustic waves in the MHz frequency range, such as those having a wavelength within a range of from about one hundred μm to about two mm. In such implementations, the thin acoustic absorber 300 can have a period within a range of about one µm to about one hundred µm.

The periodic array of indentations 332 is further characterized by a fill factor. It will be appreciated that the resonant frequency of the periodic phase—i.e. the periodic array of indentations 332—is substantially determined by the fill factor of the periodic array of indentations 332. The resonance frequency is determined substantially by the width of indentations 332. As noted above, the period of the periodic array of indentations 332 is smaller than the wavelength corresponding to the resonance frequency, (period<wavelength). At the same time, in many implementations the period and width of indentations 332 will be chosen so that the periodic array of indentations 332 has a fill factor of at least ⅕. The absorption characteristics are substantially insensitive to indentation 332 depth.

It will further be appreciated that the dynamic response of the thin acoustic absorber 300 can be controlled by modifying the damping ratio of the periodic array of indentations 332, such as by modifying the effective mass of the oscillator. The effective mass of the oscillator can be modified, for example, by altering the thickness of the reflective sublayer 320 and/or changing the fill factor of the periodic array of indentations 332.

In general, it will be desirable that the absorbing layer 310 and the fluid medium 160 are "acoustically matched", i.e. that the acoustic impedance of the absorbing layer 310 is similar to the acoustic impedance of the fluid medium 160. In some implementations, such acoustic matching can mean that the acoustic impedance of the absorbing layer 310 is within a range of from about 0.9 to about 1.1 times the acoustic impedance of the fluid medium 160; or within a range of from about 0.8 to about 1.2 times the acoustic impedance of the fluid medium 160; or within a range of from about 0.7 to about 1.3 times the acoustic impedance of the fluid medium 160; or within a range of from about 0.6 to about 1.4 times the acoustic impedance of the fluid medium 160. In less well acoustically matched variations, the acoustic impedance of the absorbing layer 310 can be within a range of from about 0.5 to about 1.5 times the acoustic impedance of the fluid medium 160; or within a range of from about 0.4 to about 1.6 times the acoustic impedance of the fluid medium 160; or within a range of from about 0.3 to about 1.7 times the acoustic impedance of the fluid medium 160; or within a range of from about 0.2 to about 1.8 times the acoustic impedance of the fluid medium 160.

Such acoustic matching can be achieved in multiple ways: by selection of a suitable fluid medium 160; by selection of a suitable chemical composition of the absorbing layer 310, by engineering the physicomechanical attributes of the absorbing layer 310; or a combination of any of the aforementioned. For example, if a specific fluid medium 160 is desired, an absorbing layer 310 composition having matching acoustic impedance can be selected, or vice-versa. In addition, the acoustic impedance of a given absorbing layer 310 composition can be modified, for example by changing its density/porosity.

Similar to conventional reflective surfaces, the metasurface has high acoustic reflection due to large impedance mismatch between gas and absorber, but permits alternating phase modulation (− reflection phase shift at the absorber/gas interface; + phase shift at the absorber/metal interface). The reflected sound of the opposite phase destructively interferes, reducing overall reflection but increasing acoustic coupling to the thin absorbing layer. The acoustic coupling can be enhanced by the resonance vibration of the gas/absorber interface so that the perfect acoustic absorber can be realized with such thin absorbing layer.

Figure 5A:
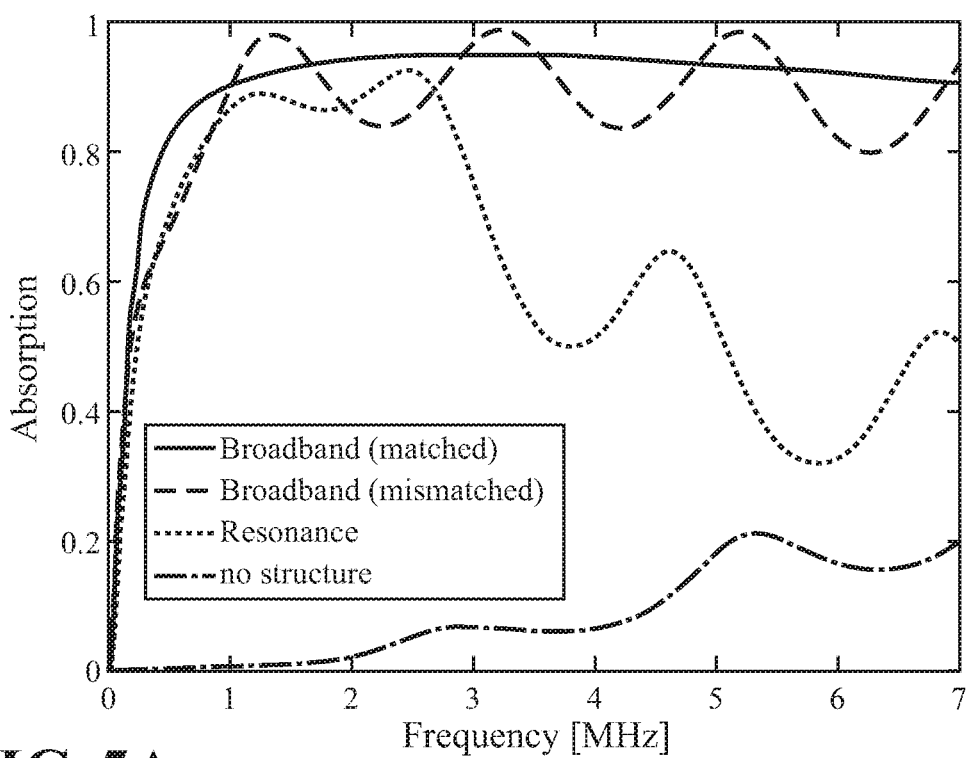
FIG. 5A is a graph showing simulated sound absorption data for the absorber of FIG. 3A and three comparative structures.

FIG. 5A shows simulated sound absorption data for four acoustic measurement systems: two systems 100 having thin acoustic absorbers 300 of the present disclosure; and two comparative examples having alternative acoustic absorbing surfaces. All four systems of FIG. 4A utilize water as the fluid medium 160. The two exemplary acoustic measurement systems 100 have a 200 µm thick PDMS absorbing layer 310 that is acoustically mismatched (dotted line) and acoustically matched (solid line) with the fluid medium 160. The comparative examples are otherwise equivalent, but instead of a thin acoustic absorber 300 have a resonance absorber (dashed line) of the type reported by Leroy et al. (Physics review B, 91, 020301 (2015)), or a 200 µm thick PDMS layer with unstructured steel underneath (dashed-dotted line). The simulations of systems 100 having the thin acoustic absorbers 300 (solid and dotted lines) are based on thin acoustic absorbers 300 having a one-dimensional periodic array of indentations 332 with a period of 40 µm, fill factor of ¼, and depth of 10 µm. As mentioned above, absorption properties are relatively insensitive to indentation depth, which can be varied within a range of at least 5 µm to 100 µm with little effect.

Both thin acoustic absorbers 300 substantially outperform the comparative examples, having absorption consistently above 80% across a range of 1-7 MHz. By contrast, the resonance absorber achieves good absorbance from about 1-2.5 MHz, but then decreases significantly at higher frequencies. The 200 µm thick PDMS on unstructured steel has relatively low absorbance at all frequencies, and does not exceed 20% in the range. The absorption of the system 100 having a thin absorbing layer 310 that is acoustically mismatched with the fluid medium 160 oscillates with frequency because of the impedance mismatch between water and PDMS. If the acoustic impedance of the absorber is matched with water, acoustic absorption can be improved (>90%; solid line). By comparison, the acoustic absorption of the resonant absorber of Leroy et al shows relatively narrow frequency bandwidth. Moreover, the acoustic absorption of the flat metal with PDMS of the same thickness is also shown, indicating that the thickness of PDMS is too thin to achieve suitable absorption.

Figure 5B:
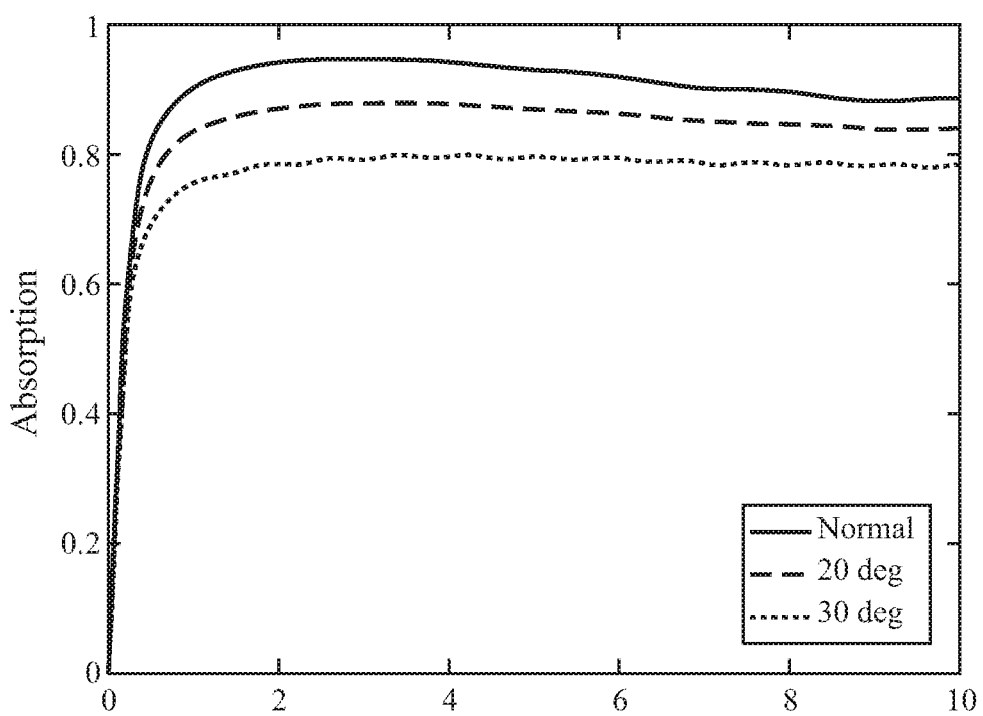
FIG. 5B is a graph showing simulated sound absorption data for the absorber of FIG. 3A with incident acoustic waves at varying angles of incidence.

FIG. 5B is a graph showing simulated sound absorption data for the structure of FIG. 3A with incident acoustic waves at varying angles of incidence. The results show that the absorber 300 possesses substantial absorbing efficiency of 75% or greater even at oblique angles up to 30°, and across a frequency range of from 1 MHz to 10 MHz. The high absorption efficiency, broad frequency range, and tolerance of oblique acoustic incidence as exhibited by the disclosed absorber 300 and shown in FIGS. 4A and 4B is unprecedented in a structure of merely about 200 µm thickness.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A system for acoustic measurement, the system comprising:
    an enclosure defined by one or more walls;
    a fluid medium contained in the enclosure for propagating acoustic waves;
    an acoustic source present at one end of the enclosure, to transmit acoustic waves through the fluid medium; and
    an acoustic absorber positioned at a portion of a surface of the one or more walls, the acoustic absorber comprising:
    an acoustically reflective sublayer comprising:
    a substantially planar surface; and
    a periodic array of indentations in the substantially planar surface, the periodic array of indentations having a period substantially smaller than a target acoustic wavelength; and
    an absorbing layer formed of a porous viscoelastic polymer and overlaid on the substantially planar surface of the acoustically reflective sublayer.

2. The system as recited in claim 1, wherein the absorbing layer has a thickness less than about 1 mm.

3. The system as recited in claim 1, wherein the periodic array of indentations is a one-dimensional array.

4. The system as recited in claim 1, wherein the periodic array of indentations is a two-dimensional array.

5. The system as recited in claim 1, wherein each indentation of the periodic array of indentations has a substantially rectangular cross-sectional profile.

6. The system as recited in claim 1, wherein each indentation of the periodic array of indentations forms an enclosure bounded by a portion of the absorbing layer, each enclosure containing a gas.

7. The system as recited in claim 1, wherein the absorbing layer comprises polydimethylsiloxane.

8. The system as recited in claim 1, wherein the periodic array of indentations possesses 90° rotational symmetry about an axis perpendicular to the substantially planar surface.

9. The system as recited in claim 1, wherein the periodic array of indentations has a period less than about 50 µm.

10. The system as recited in claim 1, wherein an acoustic impedance of the absorbing layer is within a range of from about 0.6 to about 1.4 times an acoustic impedance of the fluid medium.

11. The system as recited in claim 1, wherein the fluid medium is water.

12. An acoustic absorber comprising:
    an acoustically reflective sublayer comprising:
    a substantially planar surface; and
    a periodic array of indentations in the substantially planar surface, the periodic array of indentations having a period substantially smaller than a target acoustic wavelength; and
    an absorbing layer formed of a porous viscoelastic polymer and overlaid on the substantially planar surface of the acoustically reflective sublayer.

13. The acoustic absorber as recited in claim 12, wherein the absorbing layer has a thickness less than about 1 mm.

14. The acoustic absorber as recited in claim 12, wherein the periodic array of indentations is a one-dimensional array.

15. The acoustic absorber as recited in claim 12, wherein the periodic array of indentations is a two-dimensional array.

16. The acoustic absorber as recited in claim 12, wherein each indentation of the periodic array of indentations has a substantially rectangular cross-sectional profile.

17. The acoustic absorber as recited in claim 12, wherein each indentation of the periodic array of indentations forms an enclosure bounded by a portion of the absorbing layer, each enclosure containing a gas.

18. The acoustic absorber as recited in claim 12, wherein the absorbing layer comprises polydimethylsiloxane.

19. The acoustic absorber as recited in claim 12, wherein the periodic array of indentations possesses 90° rotational symmetry about an axis perpendicular to the substantially planar surface.

20. The acoustic absorber as recited in claim 12, wherein the periodic array of indentations has a period less than about 50 µm.

* * * * *